United States Patent Office 3,249,025
Patented May 3, 1966

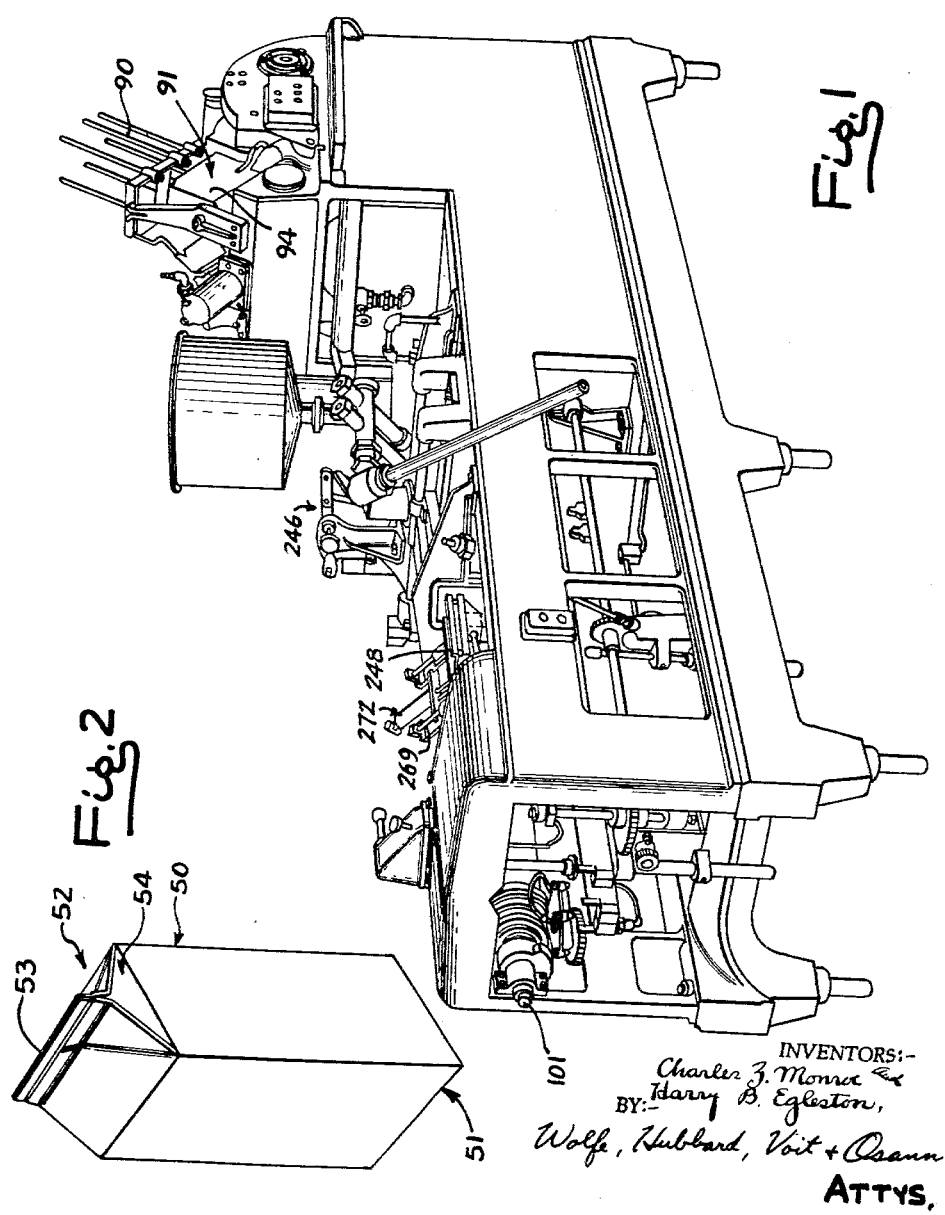

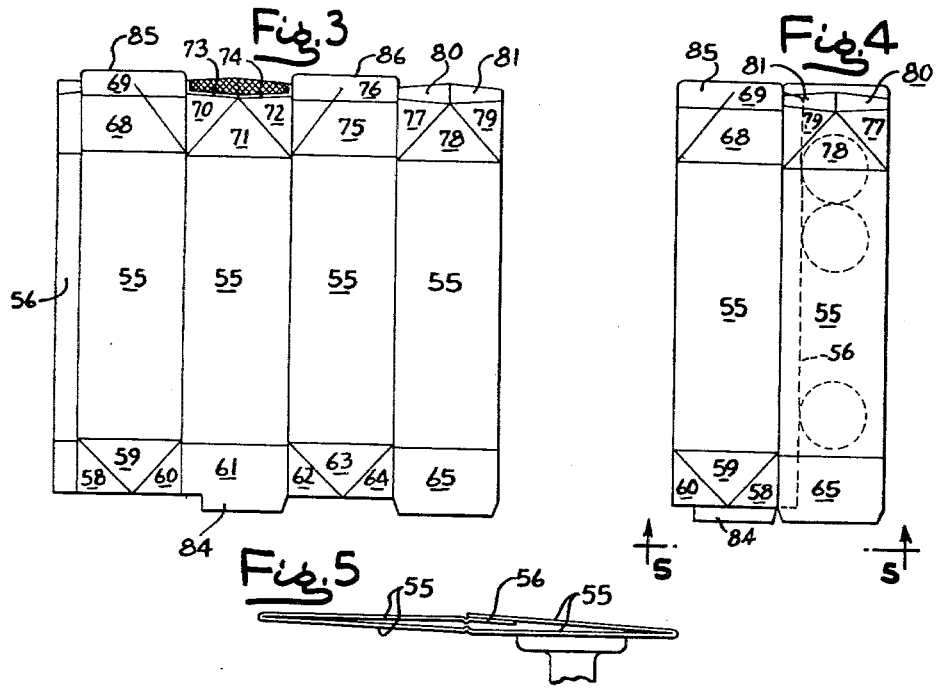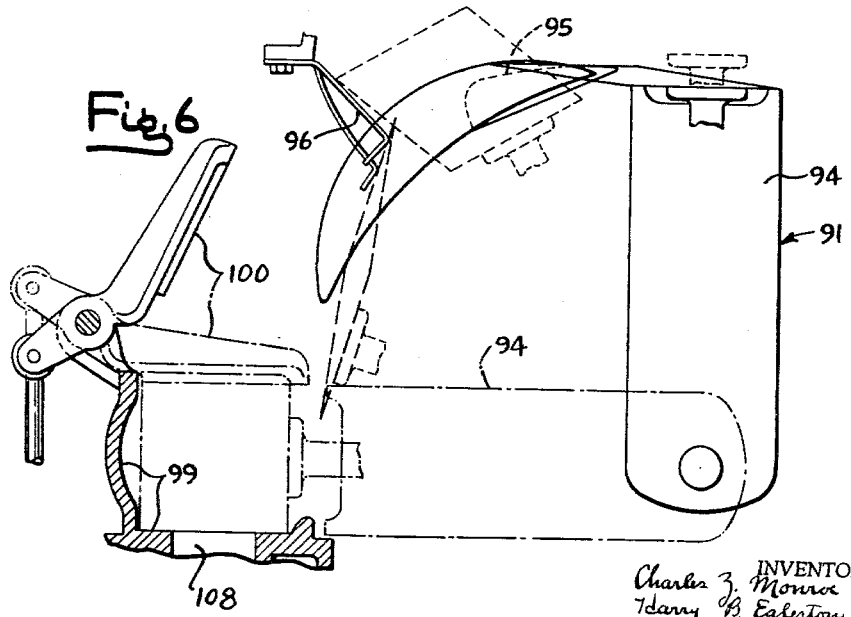

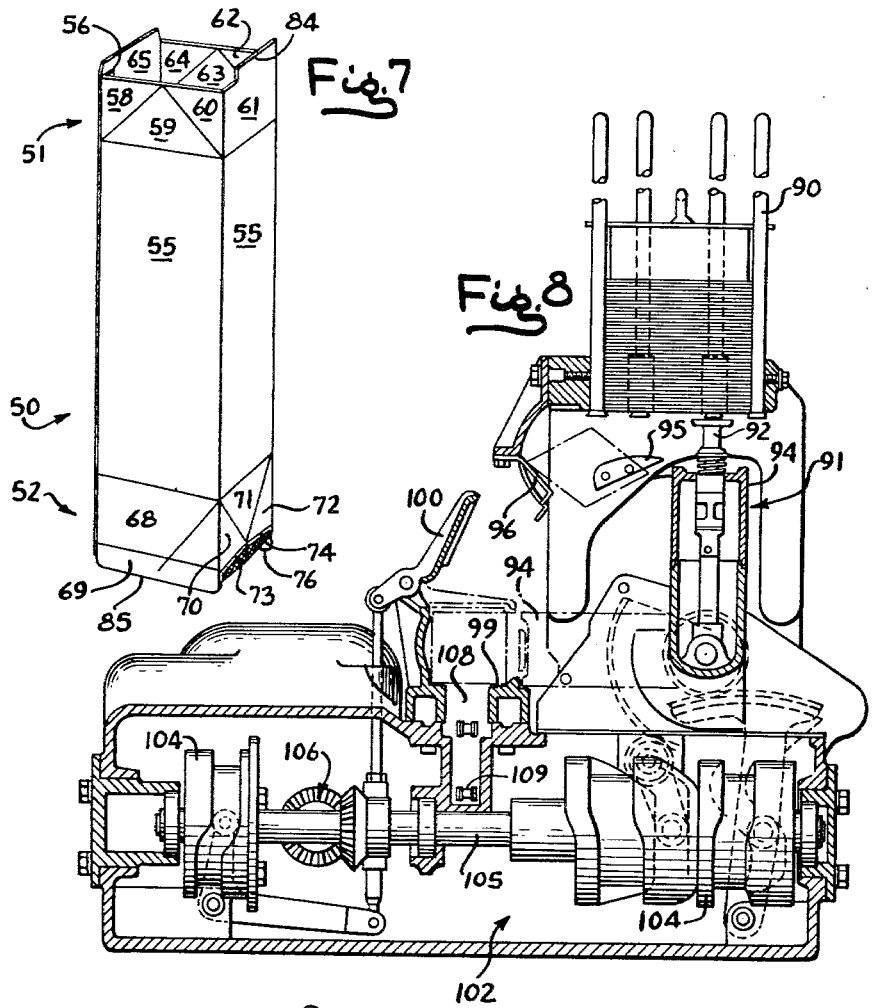
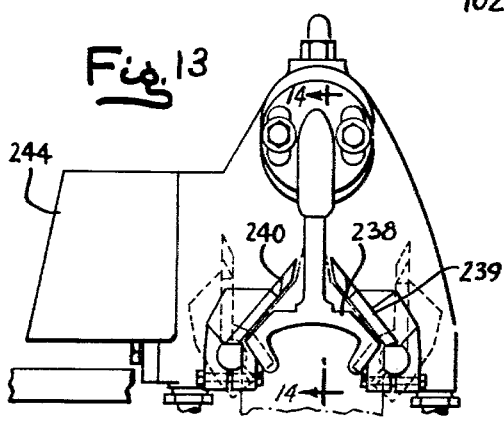
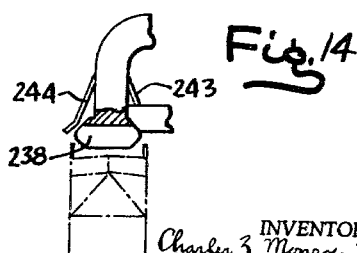

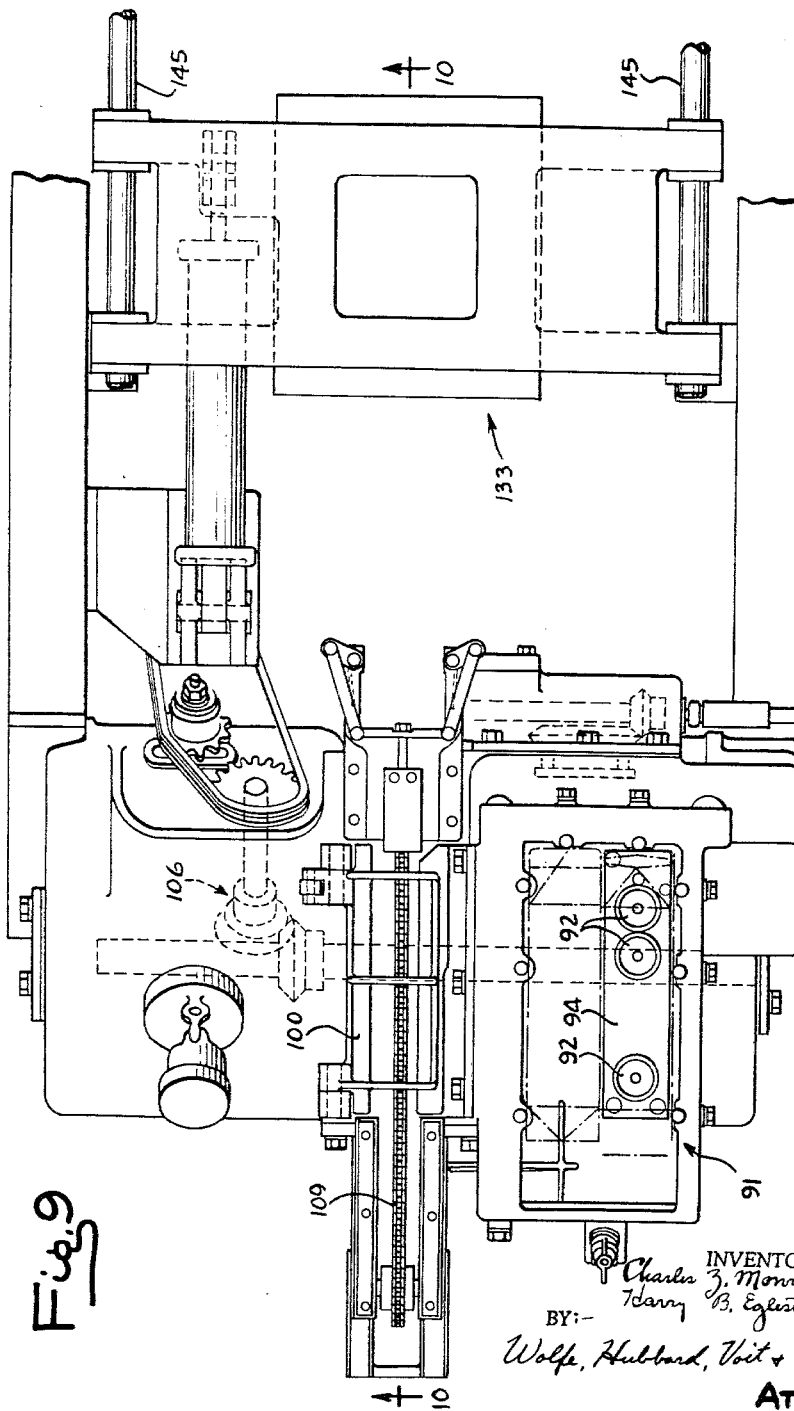

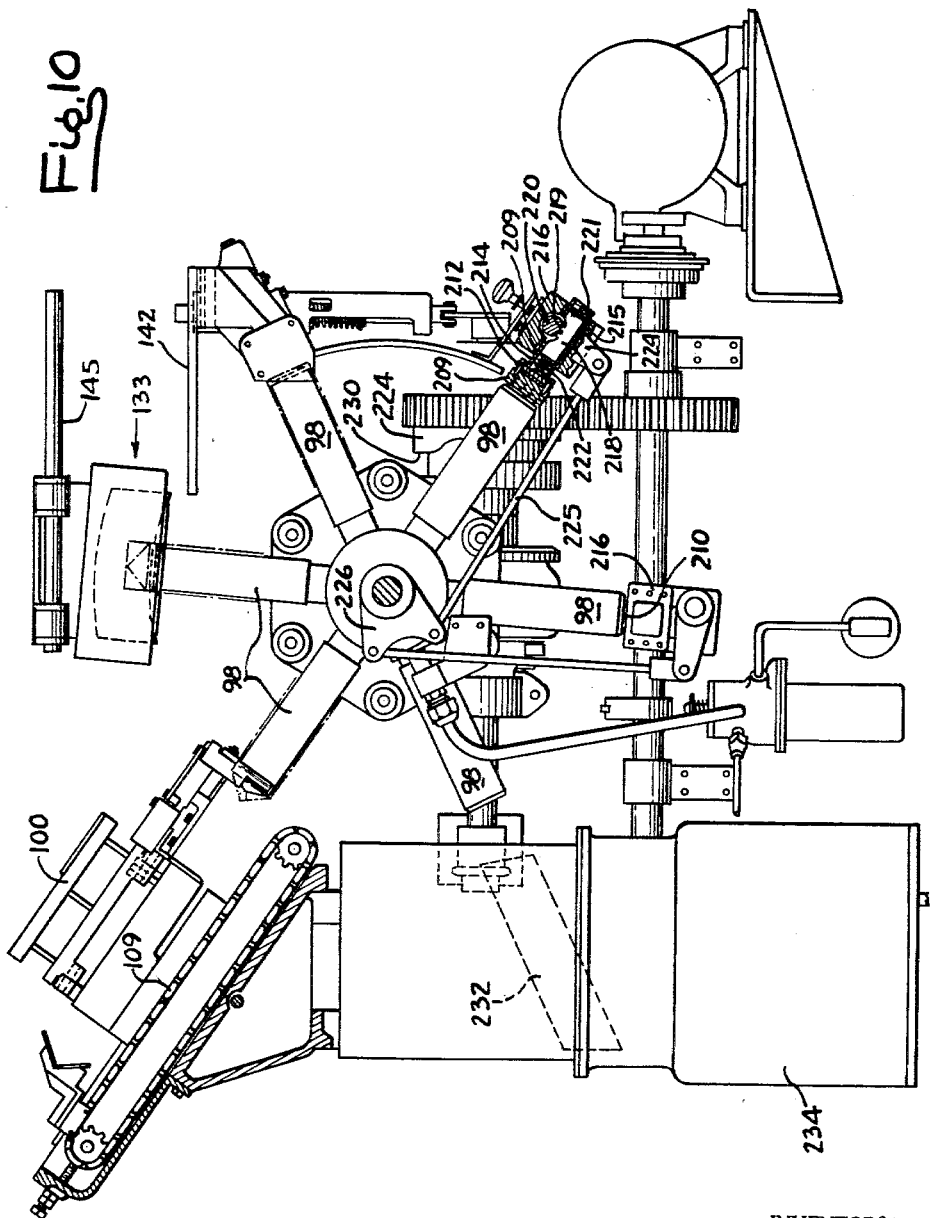

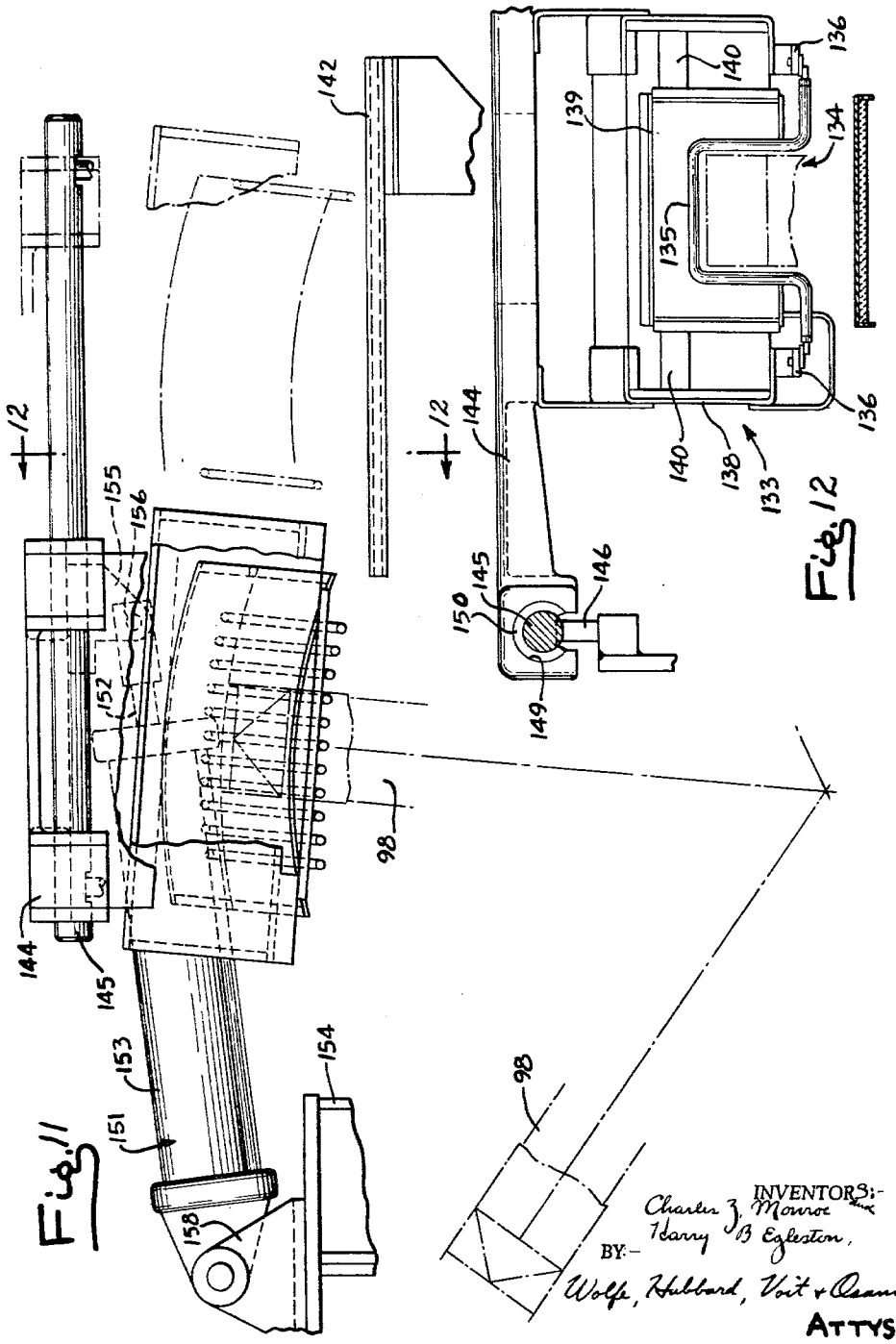

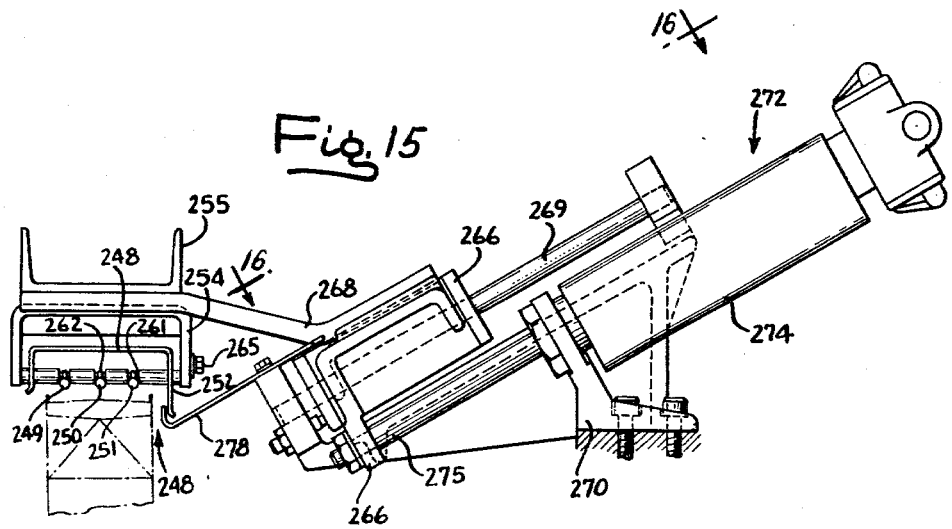
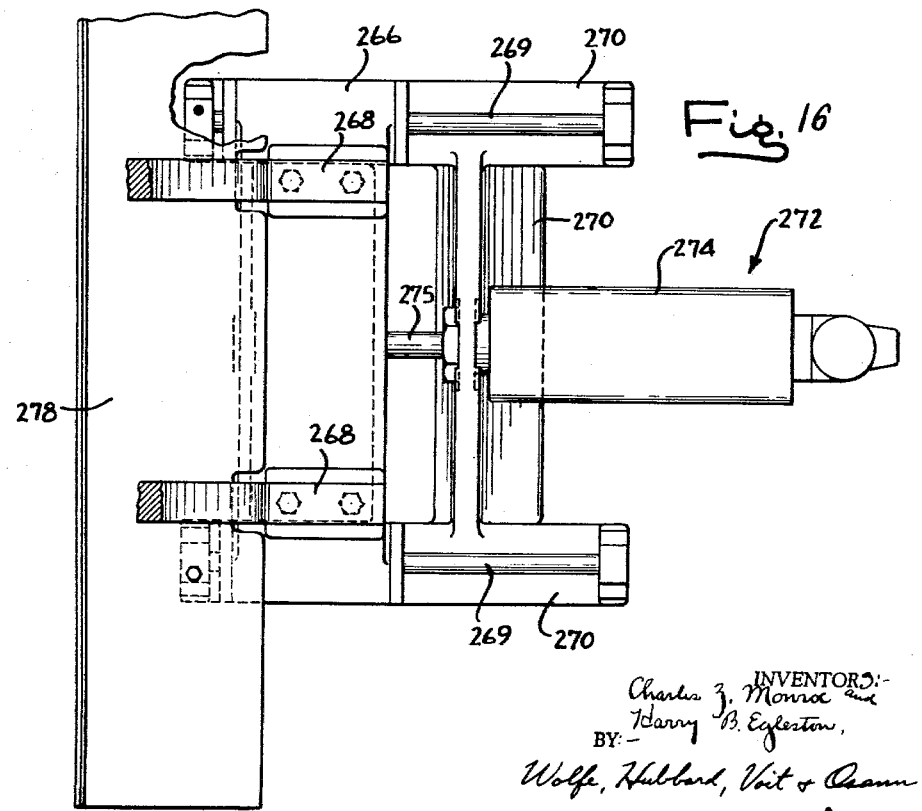

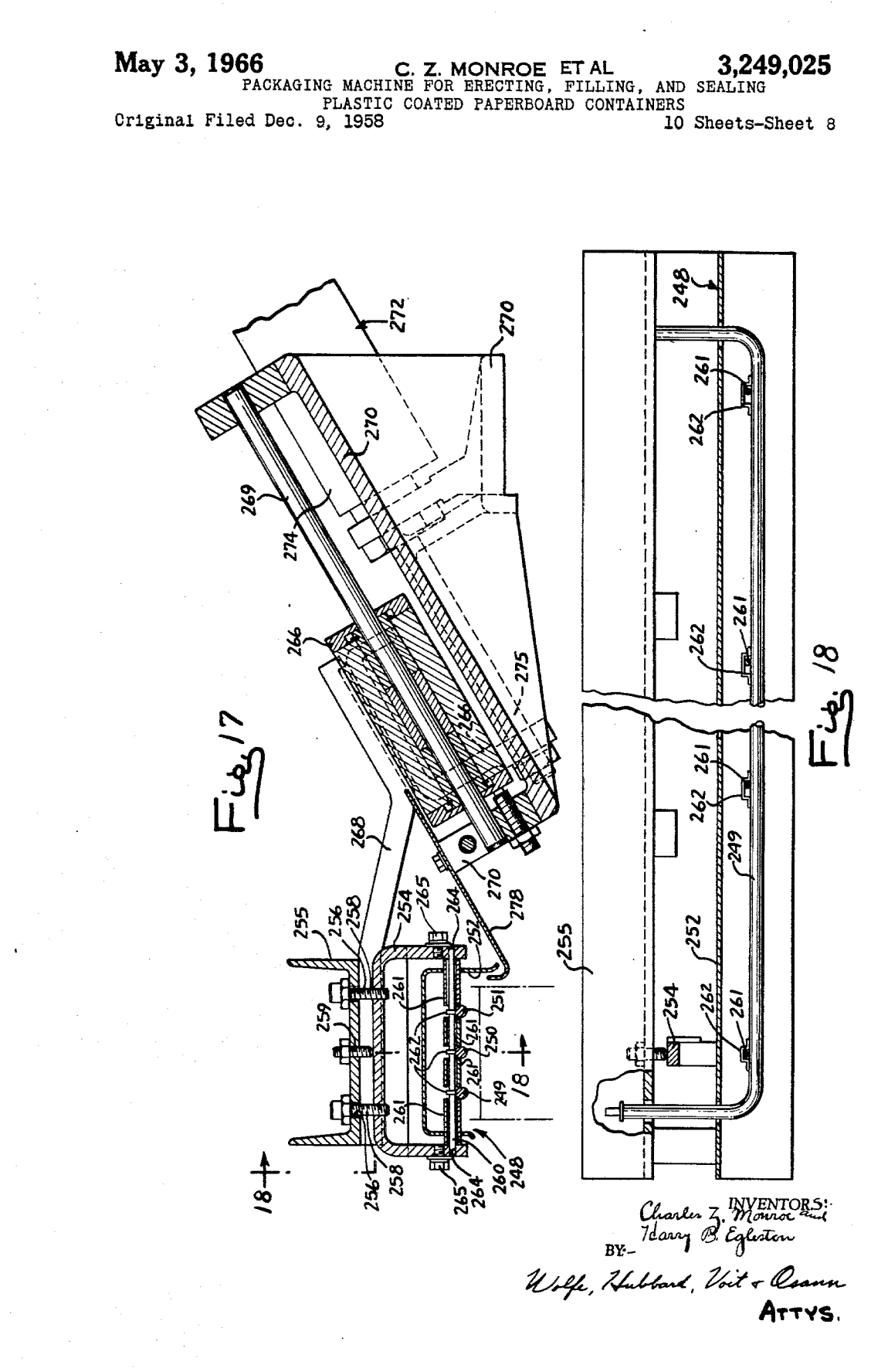

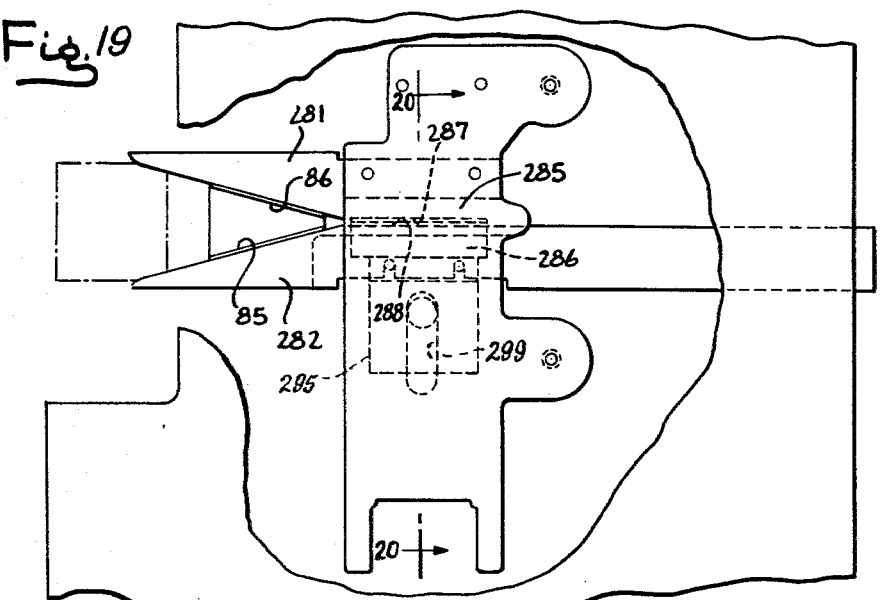
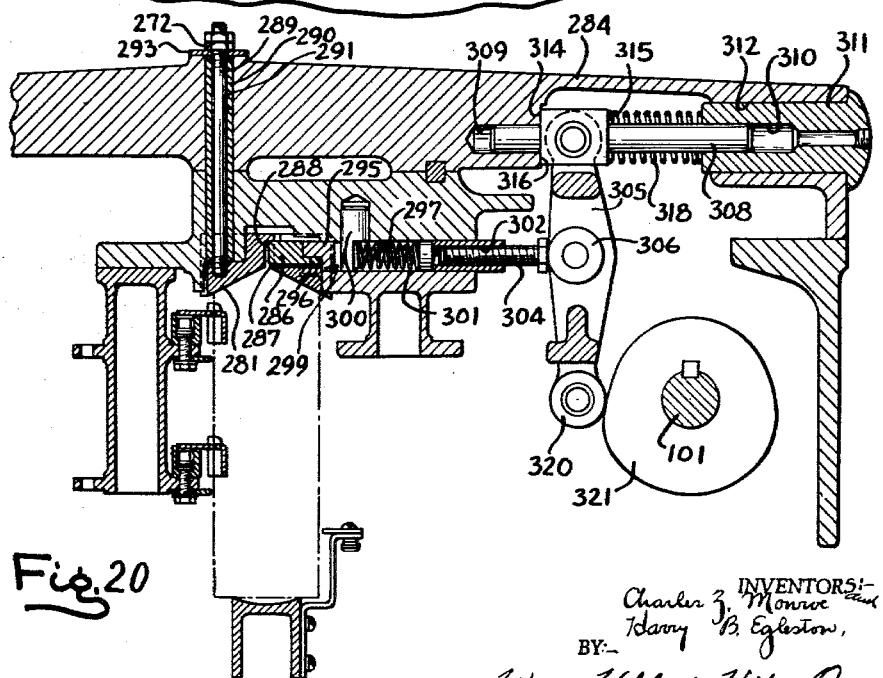

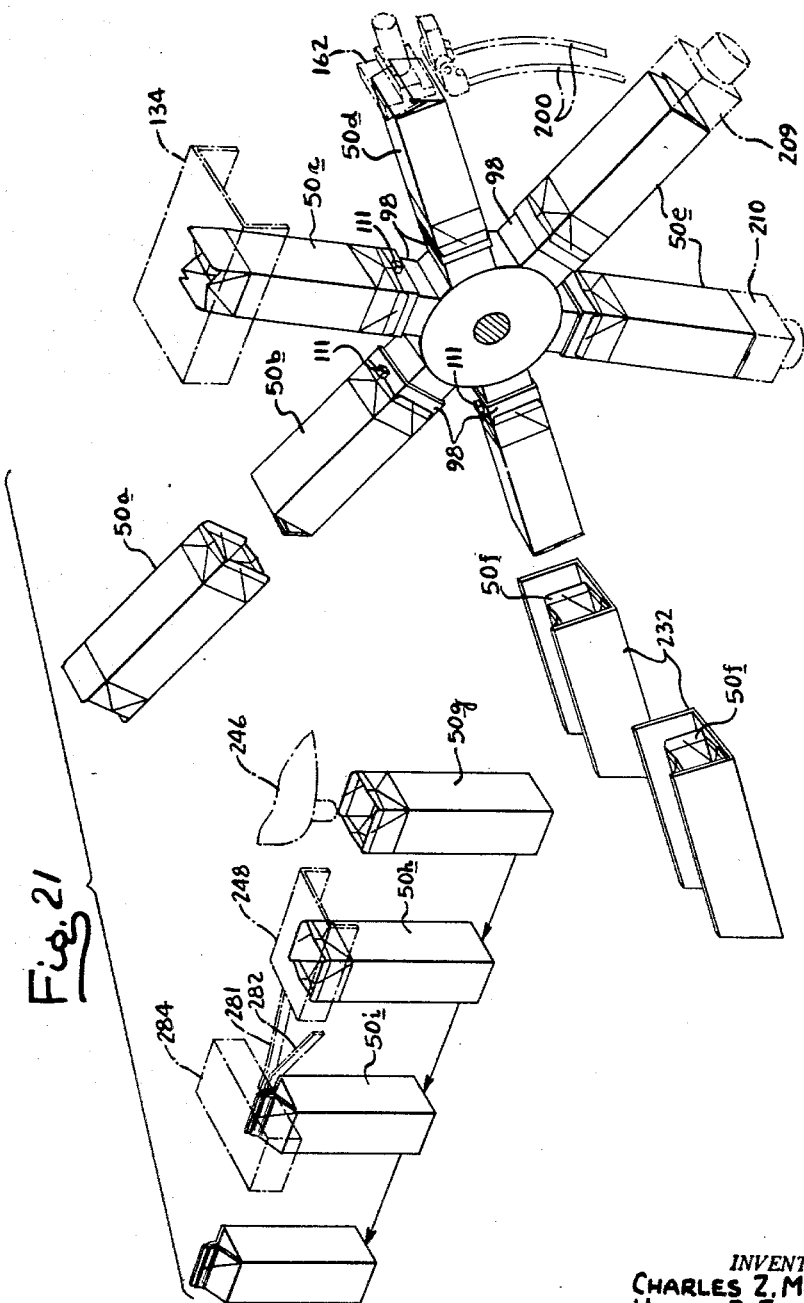

3,249,025
PACKAGING MACHINE FOR ERECTING, FILLING, AND SEALING PLASTIC COATED PAPERBOARD CONTAINERS
Charles Z. Monroe, Detroit, and Harry B. Egleston, Livonia, Mich., assignors to Ex-Cell-O Corporation, Detroit, Mich., a corporation of Michigan
Application Oct. 2, 1961, Ser. No. 142,299, now Patent No. 3,187,646, dated June 8, 1965, which is a division of application Ser. No. 779,229, Dec. 9, 1958, now Patent No. 3,002,328. Divided and this application Jan. 27, 1965, Ser. No. 439,118
4 Claims. (Cl. 93—44.1)

The present invention relates to packaging machines and more particularly to an improved packaging machine for receiving cut and scored blanks of paperboard having a coating of thermoplastic material thereon and erecting a container from such a blank, filling the container and then sealing the filled container.

This application is a division of our copending application Serial No. 142,299, filed October 2, 1961, now Patent No. 3,187,646, as a division of our copending application Serial No. 779,229, filed December 9, 1958, now Patent No. 3,002,328.

Automatic packaging machines for forming, filling and sealing containers starting with a previously cut and scored paper blank are well known in the art and have received widespread commercial use in such establishments as dairies where they find their principal function in the packaging of milk and other dairy products. Heretofore, these machines have been adapted primarily for handling paraffin impregnated paper board containers, the type in widest commercial usage for dairy products.

It has now been discovered that paperboard of the quality used for dairy product containers can be economically coated with heat and pressure sensitive thermoplastic substances. A thermoplastic substance to be used on containers in which dairy products are to be packaged is desirably one which is inert to the substance to be packaged, is strong and durable, is inexpensive and is easy to apply in sheet form onto the paperboard, either by a laminating process or by an extruding process. A thermoplastic coating of this sort must render the paper sheet material resistant to fluids which would be packed in a container including such acidic products as milk. One example of one thermoplastic substance which has been found useful for packaging dairy products is the polymer polyethylene. The paper stock to be used for forming the containers can be economically coated on both sides with a thin layer of polyethylene which is effective in imparting the foregoing properties to the paper. A container blank can be formed from the coated paperboard stock in the usual manner by stamping and scoring the blanks, folding them over and, by means of a suitable side seam, providing a flattened tube which may be erected into a container in an automatic machine.

Containers produced from the thermoplastic polyethylene coated paper board sheet material are strong, simple to erect, close and seal. The polyethylene not only protects the contents of the container against the admission of harmful substances but also serves as a sealing medium for closing and tightly sealing the container. The polyethylene coated closure flaps afford a strong and leakproof closure which remains fluidtight even under the severe handling often received by the containers.

One illustrative container of the type formed from paperboard having a polyethylene coating thereon is described and claimed in our copending application Serial No. 122,571, filed in the United States Patent Office July 7, 1961. For a more detailed description of such a container, reference should be made to that application.

As pointed out in the above-mentioned copending application, the polyethylene coating on the paperboard containers serves as a heat and pressure sensitive adhesive for the purpose of sealing the closure members of the container. When polyethylene is employed as the thermoplastic coating, suitable precautions must be taken to avoid destroying this coating as the containers are erected and sealed. The primary reason for this is the low melting point of polyethylene and its tendency to stick to heated surfaces.

It is the principal object of the present invention to provide a machine capable of receiving container blanks having an overall coating of polyethylene, or other like thermoplastic material, and forming such blanks into a container having tightly sealed closure members by employing the polyethylene coating as an adhesive.

Another object of the present invention is to provide a mechanism for fusing and sealing the polyethylene coated closure flaps of a container without destroying the integrity of the polyethylene coating. More specifically, it is an object of the present invention to provide a machine of the foregoing character which operates automatically and rapidly to heat the polyethylene coating on the surface of the container closures, and then fold and seal said closures together. A further object of the present invention is to provide a machine of the above type wherein the heat sealing mechanism is instantly ready for operation and yet which, when in stand-by position, is isolated from the machine so that the parts thereof which contact the coated polyethylene containers remain at a sufficiently low temperature to avoid sticking to the melted coating of the containers.

Another object of the present invention is to provide a machine of the foregoing character for sealing the closure flaps of paperboard containers having an overall coating of a thermoplastic material which heats the closure members to a sufficiently high temperature at one station without damaging the paperboard so that the closure members may be pressed together to form a strong, fluidtight seal at a subsequent station.

Still another object of the present invention is to provide a machine of the foregoing type which operates automatically and efficiently to produce a sterile, filled container of the type described, which machine occupies a minimum of space, is light in weight when compared to machines of the type heretofore employed, is of simplified construction to facilitate the rapid closing and sealing of the containers, and is easy to maintain in a sterile condition in accordance with the high standards in the dairy industry.

A more detailed object of the invention is to provide a machine of the above character for erecting and closing the flaps of a paperboard container having a polyethylene coating thereon, which machine first heats the polyethylene coating to above its fusion point, then tucks the closure members together, and finally presses the tucked closure members having the fused polyethylene thereon with a sufficient force to effect a liquidtight seal, so that the integrity of the film is preserved at all times. A furthr detailed object of the present invention is to provide a mechanism which is capable of fusing the polyethylene on the surfaces of the container closure members without actually coming into contact with said members.

Other objects and advantages of the present invention will become apparent as the following description proceeds, taken in connection with the accompanying drawings wherein:

FIGURE 1 is a perspective view of a container erecting, filling and closing machine embodying the present invention.

FIG. 2 is a perspective view of a sealed container of the type contemplated for use with the present invention.

FIG. 3 is a layout view of a blank showing the inside surface thereof for use in erecting a container of the type shown in FIG. 2.

FIG. 4 is a flattened tubular blank constructed from the blank shown in FIG. 3 by the formation of a side seam.

FIG. 5 is a plan view of a blank of the type shown in FIG. 4 engaged by a nozzle for withdrawing it from a magazine.

FIG. 6 is a schematic plan view of a nozzle mechanism for squaring and applying a reverse bend to the blank of the type shown in FIG. 4.

FIG. 7 is a perspective view of a squared out tubular blank.

FIG. 8 is a section view through an illustrative blank feeding and squaring mechanism.

FIG. 9 is a plan view of a mechanism for squaring and feeding a squared blank onto a mandrel for the substantial purpose of closing the bottom closure elements of the container.

FIG. 10 is a section view taken substantially in the plane of the line 10—10 of FIG. 9 and illustrating the mandrel and bottom closure mechanisms in further detail.

FIG. 11 is an elevation view illustrating a heating mechanism for heating the bottom closure flaps of the container to melt the thermoplastic coating thereon.

FIG. 12 is a view taken substantially in the plane of line 12—12 of FIG. 11 and illustrating the heating tunnel in further detail.

FIG. 13 illustrates a mechanism for preclosing the top closure elements of the container.

FIG. 14 is a fragmentary vertical sectional view through a portion of the top preclosing mechanism taken substantially in the plane of the line 14—14 in FIG. 13.

FIG. 15 is an elevation view of a heating device for heating the top closure flaps prior to sealing.

FIG. 16 is a view taken substantially in the plane of line 16—16 of FIG. 15.

FIG. 17 is a vertical section view taken through the heating device shown in FIG. 15.

FIG. 18 is a section view taken substantially in the plane of line 18—18 on FIG. 17.

FIG. 19 is a plan view of a flap closing mechanism shown with a portion of the machine housing broken away.

FIG. 20 is a vertical section taken substantially in the plane of line 20—20 on FIG. 19 and illustrating a pressure mechanism for sealing the top closure of the containers.

FIG. 21 is a diagrammatic view illustrating successive steps in the erecting, filling and closing of a container in the mechanism embodying the invention.

While a certain illustrative packaging machine will be described, it should be understood that there is no intention to limit the invention to the specific form disclosed. On the contrary, the intention is to cover all modifications, alternative constructions, equivalents, and uses falling within the spirit and scope of the invention as expressed in the appended claims.

Before undertaking a detailed description of the sealing mechanism of the present invention, it may be helpful at this point to consider the features of the container which is being erected, filled and closed. In the description of this container, it will be assumed that the container is constructed of paperboard with a polyethylene coating thereon although again it should be understood that other thermoplastic sheet materials or coatings may find equal utility and application. For a more complete description of the container, reference should be made to the abovementioned copending application, Serial No. 122,571, the disclosure in which is incorporated by reference herein.

Referring to FIG. 2 of the drawings, the container 50 there shown comprises a tubular body which is generally rectangular in cross section and provided at its base portion with a suitable bottom closure 51. The upper end of the body terminates in what will be recognized as the familiar gable topped end closure 52 surmounted by a central laminar rib or truss 53. In the particular container shown, the top end closure has incorporated therein an extensible pouring spout 54 for use in dispensing the contents of the container.

Such containers are conventionally formed from a blank of paperboard. By means of an appropriate pattern of score lines a blank (the inner face of which is illustrated in FIG. 3) is divided into a plurality of panels and areas which are utilized for the walls and the closure parts of the container. The body portion of the container is formed by four side panels 55 and a side seam flap 56 which is secured to the opposite side panel to form a side seam. Various rectangular and triangular panels 58–65 together comprise the foldable bottom portion indicated generally at 51 while another set of various rectangular and triangular panels 68–81 form the foldable top closure portion indicated generally at 52. The scorings in the blank dividing the various panels from one another as well as defining fold lines which are creased when the container is erected and the closure members are sealed are produced when the blank is cut from the initial polyethylene coated paperboard stock.

The bottom closure 51 is formed by a pair of outer flaps 61 and 65 secured to alternate ones of the side panels 55 and a plurality of triangular flaps 58–60, 62–64, secured to the other side panels. These triangular flaps are infolded when the bottom closure is formed and an appropriate tuck-in flap 84 on one of the outer flaps is inserted between the infolded triangular end panels and the opposite outer flap 65.

The top closure is designed to produce a gable topped configuration and to this end is formed with a pair of roof panels 68, 75, which are upwardly inclined in the completed closure, between which are located inner triangular panels 71, 78 each of which is surmounted by a pair of triangular fold back panels 70, 72 and 77, 79, respectively. One inner triangular panel 71 and its surmounting foldback panels 70, 72 later in the completed closure serve to define an extensible pouring spout 54. Each of the closure panels are surmounted by a rib panel 69, 73, 74, 76, 80 and 81, the outer rib panels 69 and 76 surmounting the roof panels 68 and 75 are in turn provided with upwardly extending sealing panels 85, 86. A flattened tubular blank 88 is formed by folding the blanks together and gluing the side seam, as shown in FIG. 4.

The improved container fabricating machine embodying the present invention, shown generally in FIG. 1, is designed and intended to receive at a magazine station flattened tubular blanks of the type shown in FIG. 3, to square out each blank at a squaring station until it is truly tubular in shape, as shown in FIG. 7, and thereafter to close one end, for instance the bottom, by a series of operations in a bottom closing station, which operation may be most clearly understood from an inspection of FIGS. 10 and 21. As thus completed with the bottom end closed, the container is discharged from the bottom forming mechanism and may be passed to a sterilizing bath the function of which is to reduce and eliminate any bacteria which may have accumulated on the container. Subsequently, the sterilized containers pass to a filling mechanism by which they are filled with the desired product. The filled containers then pass to a mechanism at a closing station which closes and seals the top closure of the container.

In accordance with the present invention, there is provided at the bottom closing station and at the top closing station heating means through which the closure elements are passed and which heats these elements to a temperature sufficient to melt the polyethylene coating on them. These heating means do not actually come into contact with the container elements, and thereby do not destroy or otherwise damage the integrity of the hot film. The temperature to which the closure elements are heated is high enough so that a sufficient amount of heat is retained to keep the polyethylene film molten or at least tacky during the subsequent closing operations. The heated flaps are then closed by engagement with suitable cold metallic closing means, and finally a pressure is exerted on the closed flaps to effect a complete seal of the closure elements and thereby of the container.

For the purpose of erecting the blank and forming the bottom closure one mechanism which has been employed is illustrated in Patent No. 2,357,535, issued September 5, 1954, on the application of C. Z. Monroe. The mechanism embodying the present invention is quite similar to the mechanism shown in this patent although it includes certain improvement embodying the present invention for the purpose of closing and sealing the plastic coated paperboard container blanks. In the container erecting, filling and sealing machine shown in the aforementioned patent, and illustrated generally in FIG. 1, the steps in the process of producing a completed package, starting from a container blank, are briefly as follows. A blank having appropriate score lines is withdrawn from a magazine, squared out to a generally rectangular configuration and placed on a mandrel with the bottom closure portion extending outwardly from the end of a mandrel. The bottom closure is then completed. If the container is to be coated or otherwise treated, it is next passed through a treating station and then to a conveyor which carries the erected but open container through the filling and top closing stations.

Following this general procedure the plastic coated container for which the machine of the present invention is particularly adapted to erect and fill is supplied in the form of blanks to a magazine 90, mounted on the machine frame, from which blanks are withdrawn one at a time on top of the machine frame. For withdrawing a container blank from the magazine an appropriate nozzle mechanism 91 is provided. This nozzle mechanism, which is primarily of the character described in U.S. Patent No. 2,357,535 is made up of a plurality of nozzles 92 which project outwardly from a housing 94 to engage one panel 55 of the container blank. The nozzles 92 then retract to withdraw the container blank from the magazine 90 and the nozzle housing 94 rotates carrying the container with it. During this rotation the container blank is moved past a stop 95 (FIG. 8) and an erecting or squaring device 96 which act together to open the blank and square it to a generally rectangular position as shown in FIG. 7. To insure that the container blank remains open, it is given a reverse bend as the nozzle mechanism 91 carries the container past the squaring device 96. The squared out blank is next placed on a suitable rectangular mandrel 98 which carries it through the bottom closing steps. Prior to the placing of the open tubular container onto the mandrel 98, the blank is squared by inserting it between a pair of perpendicularly disposed squaring members 99 (FIG. 8). The nozzle housing 94 forms a third side of the squaring mechanism while a gate 100 swings downwardly on top of the container to complete the squaring operation.

The mechanism of which the mandrel 98 is a part comprises a wheel-like device having a plurality of mandrels 98 extending outwardly as spokes. When a container has been squared and with the mandrel in position for receiving it, a mechanism engages one end of the container and pushes it onto the mandrel. The wheel then rotates to carry this container through the various bottom closing stages.

The mandrel mechanism, as well as most of the other mechanisms of the packing machine are operated in mechanical synchronism. To this end, the elements of the machine are operated from a main drive shaft 101 on which are located a plurality of take-off cams and gears. The nozzle and gate mechanism are driven by a suitable cam mechanism 102 including a plurality of cams 104 secured to an auxiliary shaft 105. This shaft is driven by an appropriate gear connection 106 with the main shaft 101.

Means are provided for heating the bottom closure end of the container to a sufficient temperature to fuse the polyethylene thereon and yet preserve the integrity of the polyethylene film so that it can function as an adhesive in forming the end closure. This is accomplished by a heating unit 133 defining a tunnel 134 through which the projecting bottom closure flap members of the containers pass as the mandrels 98 on which they are carried rotate. The surfaces of the bottom closure flaps are not contacted by the heaters but rather the heat within the tunnel 134 is sufficient to fuse the polyethylene on both sides of the flat paperboard surfaces while maintaining the integrity of the film. It will be appreciated that the temperature level and thus the heat content of the paperboard container should be sufficiently high so that the paperboard will retain its heat over the period of time required to close and seal the bottom flaps.

One illustrative heating tunnel is shown in FIGS. 11 and 12 and comprises a plurality of generally U-shaped heating elements 135 the ends of which are secured to spaced bus bars 136 supported on a housing 138. The heating elements 135 which may comprise, for example, a continuous coil of wire wound on a ceramic core and surrounded with a nickel steel sheath, one commercial form of which is sold under the trademark "Chromolox" by Edward Weigand Company, are electrically secured to the bus bars and are axially aligned one with the other so as to define a curved tunnel having a radius of curvature substantially equal to the radius of rotation of the container flaps to be heated. In the heating tunnel described, the surface temperature of the heaters is about 1600° F., and it has been noted that at a distance of about ½ inch from the heaters, the temperature is 1300° F. The tunnel is dimensioned to provide a clearance of between ¼ inch and ½ inch from the surfaces of the container flaps. With this construction, and with a dwell time of about .9 second and a total heat exposure time of about 1 second it has been found that the surface temperature of the flaps is raised to somewhat in excess of 300° F. As pointed out in the copending application describing the plastic coated containers, the temperature of the polyethylene coating must be raised to about 300° F. in order to fuse the coating and heat the paper sufficiently so that the flaps retain enough heat for the subsequent pressure sealing operation. The overall lapsed time after heating before the flaps are folded and pressure is applied to seal them together is about 1½ seconds.

For directing the heat radiated by the heating elements 135 onto the container flaps, the elements 135 are surrounded by a reflector 139. This reflector is generally arcuate in shape so that it conforms to the alignment of the heating elements. To support the reflector 139 within the housing 138 a plurality of rods and spacer elements 140 are provided mounted between the longitudinal vertical walls of the housing and reflector.

Heat losses from the heating unit are kept to a minimum by lining the inner surfaces of the housing 138 and the outer surfaces of the reflector with a suitable insulator medium such as a refractory sheet material.

In order to reduce or eliminate warm up time in the event it is necessary to shut down the machine temporarily, it is desirable that the heater remain hot. Under such circumstances, however, should a container be on a mandrel within the tunnel when the machine motion stops, the extreme temperatures within the tunnel will ignite the paper of the container. For this reason, provision is made for removing the heater tunnel from its position over the container and mandrel to an out of the way position. At the same time, to avoid excessively heating the adjacent areas of the machine, it is desirable to isolate the tunnel from the adjacent exposed metal parts of the packaging machine so as to block the radiation of heat from the heating elements. To this end the tunnel means are provided for removing the heating unit from its position above the mandrel to a retracted position above an insulating reflector plate 142 secured to the machine frame. The illustrative means shown in the drawings for this purpose comprises a bridge 144 which is guidably mounted on a pair of spaced rods 145 and which supports the heating unit 133 secured to the machine. The rods 145 are mounted, by means of spacer brackets 146, onto a support 148 secured to the sides of the machine at each side of the mandrel positions. The bridge 144 is formed with a pair of grooves 149 having appropriate bushings 150 therein for slidably receiving the guide rods 145.

For purposes of sliding the heating tunnel 133 back and forth on the guide rods 145, there is provided an air cylinder motor 151, the piston 152 of which is secured to the bridge and the cylinder 153 of which is mounted on a cylinder support bracket 154 secured to the machine. The piston end is secured to a depending bracket 155 on the bridge clevis by means of a clevis pin 156. A similar construction 158 is employed mounting the cylinder 153 to the cylinder support bracket 154 on the frame.

The air cylinder motor 151 is controlled by an appropriate valve 160 which is actuated whenever the motion of the mechanism stops, as will be described in further detail below. With this safety feature, whenever the machine stops, with the attendant danger that the mandrel and container will be positioned within the heating tunnel, the tunnel motor 151 is immediately energized to slide the tunnel to its inactive position over the insulating plate 142. The heating elements remain hot until deliberately turned off by the machine operator, and are thus ready for immediate use without the delay involved in a warm up period. The heating elements 135 are operated at close to 100% of their capacity, and their temperature is controlled by a suitable controller which, once the maximum temperature is reached, cycles in an on-off manner to maintain the temperature of the heaters at the desired level.

After the polyethylene coating on the bottom closure flaps has been activated and raised to its fusion point, the mandrels index the container out of the heating tunnel and into a position where means are provided for engaging the closure flaps and folding them together as a bottom closure. The flap arrangement, as described in detail in the above mentioned copending application relating to the plastic coated container, and to FIG. 7, is such that the flaps can be folded together by bending the triangular infold panels 59, 63 inwardly with the bottom flap panels 61, 65 outermost. As these flaps are folded together, the tuck-in flap 84 on one edge of a bottom flap 61 is inserted beneath the cut edge of the other bottom flap 65.

For applying a sealing pressure to the containers there are provided two sets of pressure pads 209, 210 which can be applied simultaneously upon the bottom of two separate containers at different mandrel positions. With such an arrangement a sealing force is applied to the bottom closure of a single container at two successive positions (FIGS. 10 and 21). These pressure pads are constructed and operate substantially as described in U.S. Patent No. 2,357,535.

Upon further indexing of the mandrels carrying the containers with the now sealed bottom flaps, the containers may be positioned in front of a series of baskets 232 for carrying the containers through a sterilizing medium. The containers are removed from the mandrels and placed in the baskets, as described in the aforesaid patent, by means of compressed air which serves to blow the containers off the mandrel into the basket. This is accomplished by appropriate means supplying compressed air into the mandrels at the container discharge position. The compressed air escapes through holes in the end of the mandrel and, because the container is sealed, creates a pressure within it which serves to blow the container into the basket. The series of baskets 232 shown schematically in FIG. 10 are carried on a chain and pass through a bath of water 234 maintained at approximately 200° F. The water is heated by an appropriate steam source much like that used previously for heating the paraffin with which the containers were coated as described in Patent No. 2,357,535. It has been found that the near boiling water bath is highly effective for killing any bacteria which may have been formed on the containers during the erecting and sealing operations.

From the boiling water bath, the containers are positioned in any suitable manner in a conveyor chain 235 with the open top end of the containers in an uppermost position so that the containers may subsequently be filled and sealed.

The conveyor for advancing the containers includes container body gripping fingers 236 which engage the front and rear side wall panels of the container and hold the container tightly as it proceeds in a step-by-step manner through the filling and closing mechanisms. The conveyor is of the intermittently acting type so that the containers move forwardly with a step-by-step motion halting only briefly between movements to give the filling and closing mechanisms an opportunity to perform their stated functions while the container is stationary.

As described above, the top closure end of each container comprises a plurality of panels 68–81 defined by score lines which define boundaries of the interconnected panels. Included among the panels are a pair of outer roof panels 68, 75 and inner triangular panels 71, 78. It has been found to be advantageous to effect a preliminary top closing operation just prior to the introduction of the charge of liquid which the container is to retain. The primary purpose of this preliminary top closing is to break the score lines and facilitate the completion of the closure after the container is filled. One illustrative mechanism for carrying out such a preliminary top closing action is shown in U.S. Patent No. 2,410,587 to C. Z. Monroe. The disclosure of this patent is incorporated by reference herein, but for the present purposes a brief description of this mechanism will be given. Essentially, the preliminary closing mechanism comprises a mandrel 238 which is insertable into the container body during the folding or closing and so positioned therein as to insure that the closure is made along the score lines. Operatively associated with the mandrel are a pair of opposed generally triangular folding fingers 239, 240 which engage the triangular infold panels 71, 78 of the container closure. To effect a partial closing, the mandrel 238 is lowered into the open mouth of the container and the triangular fingers 239, 240 swing downwardly and inwardly against the mandrel to give a preliminary bend to the score lines defining the triangular top closure panels. The mandrel and fingers are mounted for vertical movement on an appropriate support 241 and are actuated by any suitable means including a cam secured to the main cam shaft of the machine so that the partial closing mechanism is operated in synchronism with the remainder of the machine and with the movement of the conveyor.

In order to insure that the score lines defining the top closure are fully broken or bent, means are provided for completing the closure but without sealing the flaps together. One illustrative means for accomplishing this purpose comprises a set of outwardly and downwardly inclined steeple plates 243, 244 supported on the bracket mounting the mandrel and finger mechanism and which extend over the conveyor to provide a second preclosing operation on each container. This second preclosing operation serves particularly to insure that the score lines defining the upstanding rib panels are given a prebend, thereby avoiding difficulty in later closing the filled container.

From the preclosing mechanism, the open containers are carried by the conveyor to a filling mechanism of any conventional type and indicated generally at 246 (FIG. 1). Such mechanism operates to fill a predetermined charge of milk or other product into the open topped containers. Associated with this filling mechanism may be appropriate auxiliary devices such as defoamers and the like. Again, the containers are carried by the conveyor through the filling mechanism in a step-by-step manner, and the filling mechanism operates in synchronism with the conveyor.

It will be appreciated from the above description of the container that the top closure flaps thereof are coated on both sides with a thermoplastic material such as polyethylene. Accordingly, in accordance with another aspect of the present invention, means are provided for heating the surfaces of the top closure ribs and for pressing these heated surfaces together to effect a seal of the container closure. As described in connection with the bottom sealing mechanism, it is necessary to heat the closure flaps to a sufficiently high temperature to insure that the polyethylene is fused without destroying its integrity as a film and to further insure that the closure elements remain hot enough for a sufficient length of time to permit the flaps to be closed and pressed together. Accordingly, an appropriate mechanism is provided for heating the inner surfaces of the upstanding ribs on the closure panels and subsequently for closing the panels so that the heated ribs portions are in juxtaposed relation and finally for applying a sealing force to sealingly press the closure ribs together and thereby form a liquidtight top seal on the container.

One illustrative mechanism for heating the rib panels or ribs of the top closure is shown in FIGS. 15–18 and comprises a heating tunnel 248 having three longitudinallly extending heating elements 249, 250, 251 mounted therein and positioned above the conveyor so that as the container is carried therealong the outer sealing flaps 85, 86 extend upwardly between the tunnel walls and with the heating elements extending between them. In this manner the rib panels 69, 73, 74, 76, 80, 81 pass directly below the heating elements and the heat is directed primarily onto the inner surfaces of the rib panels.

The tunnel itself comprises an elongated sheet metal channel or reflector 252 supported by a pair of yokes 254 on a base member 255. The yokes 254 are mounted on the base member 255 in a manner enabling it to be tilted relative thereto. To this end, the base member is provided at a point adjacent each yoke with a pair of spaced apertures 256 through which extend bolts 258 threadably engage with the yoke 254. Intermediate the bolts is a pin 259 fixed to the base 255 and abutting the upper surface of the yoke 254. By adjusting the threaded engagement of the bolts with the yoke 254 the latter can be tilted relative to the base 255. Extending between the depending legs of the yoke and through the tunnel housing is a rod 260 which serves to support both the tunnel reflector 252 and the heating elements 249–251. For the latter purpose, the rod 260 is provided with a plurality of spacers 261 while each heating element is formed attached at intervals to a generally U-shaped bracket member 262 through which the rods 260 extend. The rods are supported in appropriate apertures 264 in the yokes and are prevented from sticking out of the apertures by caps 265 threadably engaged in the yoke. The heating elements themselves may be of the type described above. Each of these heating elements is connected to an appropriate power source and control so that their temperature may be regulated, the power source and control being of any suitable type known in the art.

Means are provided for movably mounting the tunnel on the mechanism so that it may be located over the conveyor or, in the event it is necessary to stop the movement of the conveyor, may be withdrawn to an out of the way position where it can remain energized without heating the adjacent metal parts of the packing machine. One illustrative mounting means is shown in FIG. 15 and comprises a bridge member 266 to which the heater unit is attached by a pair of spaced arms 268. The bridge member 266 is guidably mounted for traversing movement on a pair of spaced rods 269 mounted on a frame member 270 secured to the main frame of the machine and at an inclined position relative to the conveyor. Suitable bearings 271 are provided in the bridge 266 for slidable engagement with the rods 269. The bridge 266 and the heating tunnel 248 carried thereby is traversed along the rods 269 by means of an air motor 272 which may be of the piston and cylinder type. The cylinder 274 of the air motor is mounted on the frame member 270, and the free end of the piston 275 is secured to the bridge 266.

For reflecting radiated heat and for protecting the other metallic machine elements from heat radiated by the heating elements in the tunnel, there is provided on the forward end of the frame support a reflector or guard 278 having an upturned longitudinal edge 279 adjacent a depending leg of the tunnel. This reflector is positioned at one side of the conveyor so that when the tunnel is retracted by the air motor it is positioned above the reflector and thus shielded from the conveyor and packaging machine structure. The inclined position of the rods guide the heating tunnel both laterally away from the containers on the conveyor and upwardly so that the edge of the tunnel reflector does not come into contact with the upstanding container flap when the tunnel is moved. The slight lifting of the tunnel also serves to reduce the heating of the machine parts when the tunnel is over the reflector 278.

Once the inner surfaces of the container ribs have been heated to a sufficiently high temperature to fuse the polyethylene thereon, the containers pass through a closure mechanism which engages the outer surfaces of the container ribs and roof panels and urges them together to a closed position. This closing operation is facilitated, as pointed out above, by the preliminary closing carried out before the container is filled.

For the purposes of closing the ribs and pressing them together, there is provided a pair of spaced closing rails 281, 282 which are generally triangular in shape and are positioned to define a converging slot 283 located above and parallel to the conveyor. These rails are aligned above the conveyor and converge in the direction of movement thereof so that the upstanding ribs and sealing flaps of the containers pass between them and are thereby urged together. When the containers have passed between the closing rails 281, 282 as shown in FIG. 19 they are engaged by a pressure or sealing mechanism which applies a pressure to the upstanding ribs and sealing flaps of the container for the purpose of sealing them together. The polyethylene coating on the inner surface of the ribs, being tacky from passing through the heating tunnel, adheres to the polyethylene surface on the opposite rib and forms a polyethylene-to-polyethylene bond. The seal thus formed is exceptionally strong and is liquidtight. One illustrative pressure sealing mechanism is shown in U.S. Patent No. 2,212,449 and is capable of applying a sufficiently heavy pressure so that the various plies or panels comprising the closure rib are closely pressed together and the fused polyethylene is caused to flow and occupy the spaces and crevices intermediate the several panels which might otherwise serve as ducts or passages for the escape of liquid.

The pressure sealing mechanism shown in FIGS. 19 and 20 comprises a bridging member 284 the ends of which are supported on the side frame members of the machine. Supported on the bridging member are a pair of spaced container rib engaging jaws 285, 286, one of which, 285, is stationary and the other of which 286, is movable. Both jaws are provided with opposed rib engaging surfaces 287, 288, respectively. The stationary one of these jaws, 285 (shown on the left in FIG. 20), is integral with and forms a continuation of the adjacent closing rail 281. The opposite closing rail is formed with a cut away portion for receiving the movable jaw 286. The stationary jaw 285 which forms a continuation of the closing rail 281 is supported on the frame by a manually operable locking device comprising a vertically extending rod 289 slidably retained within a bushing 290 mounted in a cylindrical aperture 291 formed in the frame 284 and threaded at its lower end in the jaw 285, and having on its upper end a pair of nuts 292 and a washer 293 engaging the frame. While the mass of cold metal defining the jaws is usually sufficient to cool the hot container flaps, suitable cooling coils may be provided in the stationary jaw if desired.

The movable jaw 286 is secured to the forward end of a slide 295 by an appropriate means such as screws or the like and is formed with a tongue 296 fitting closely within a corresponding slot formed in the forward edge of the slide. The slide member 295 is in the form of a flat plate which is retained within a horizontally extending slideway 298 defined by the frame 284.

The slide 295 is longitudinally slotted, the slot being shown at 299, for receiving the flattened lower end of a stud 300 secured within a suitable recess in the frame 284. Housed within the slot 299 and having one end bearing against the end of the slot and the other end against the stud is a coiled compression spring 301 which acts to project the slide to its inoperative position, that is, to the right as shown in FIG. 20. The end of the slide remote from the jaws is provided with a threaded aperture 302 for threadably receiving a headed bolt 304.

For operating the slide there is provided a vertically extending lever 305 having at approximately its midpoint a roller 306 engaging the head of the bolt 304. At its upper end the lever 305, which is preferably of the bifurcated type, is pivotally connected to an enlarged intermediate portion of a rod member 308, one end of which is slidably retained within a horizontally extending cylindrical aperture 309 defined in the frame, and the other end of which is slidably retained with an axial cylindrical aperture 310 formed in a plug or bushing 311. The plug is in turn received within a corresponding aperture 312 in the frame 284 and has threaded engagement therewith for axial adjustment. The rod is formed with a pair of shoulders 314, 315 on opposite sides of the enlargement to which the lever is pivoted. One of the shoulders 314 engages a corresponding shoulder 316 on the frame 284 while the other shoulder 315 receives a spring 318 surrounding the rod and acting between the shoulder 315 and the end of the bushing 311.

At its lower end, the lever 305 is provided with a roller 320 which bears against the periphery of the cam 321 fixed upon the main cam shaft 101. The cam is shaped so that the slide 295 is given a preliminary rapid movement toward a container rib which is positioned to be acted upon, followed by a relatively slow final movement as the face 288 of the movable jaw 286 comes into contact with the container rib so that the rib is subjected to a heavy pressure during a short travel of the jaw. This heavy pressure occurs as a result of the helical coil spring 318 acting against the rod member 308 at the upper end of the lever 305. For a more detailed description of this pressure mechanism, reference should be made to the aforementioned Patent No. 2,212,449.

To insure that the container is tightly sealed it is engaged by the pressure pads at two dwell positions, that is, the container ribs are pressed together and when the container indexes one step forward the ribs are again pressed together. From this final sealing step the containers are discharged to an appropriate loading conveyor mechanism or loading table.

If desired one or both of the pressure pads at the bottom and top closure stations may be coated with a layer of a tetrafluorethylene containing coating material in order to reduce the possibility of their sticking to the hot polyethylene coating on the closure flaps. Because the pressure pads are not heated, however, it has been found that the cold metal does not stick to the polyethylene. With the provision of means for retracting the heating tunnels to an out of the way position above the reflectors, the metals parts of the mechanism which come into contact with the heated polyethylene coated container surfaces remain sufficiently cool so that they do not stick to the polyethylene.

Any suitable control circuit may be employed for the foregoing machine. It is desirable that this control circuit include appropriate means for withdrawing the heating tunnels when the machine mechanism stops and for insuring that the heating tunnels are not positioned above the sealing positions until the machine is ready for operation. One method of accomplishing this is by an appropriate switch (not shown) connected as an overload switch on the machine clutch. In the event the machine jams, the overload switch operates causing the tunnels to be retracted from their positions for heating the container flaps and positioned above the reflector plates. The positioning motors for the heating tunnels are normally operative to hold the tunnels over the protective reflectors, and a safety switch (not shown) prevents the actuation of the motors to place the tunnels in operative position when, for example, the sealing temperature is not reached or the sterilizing bath water is not hot.

By way of summary it may be helpful at this point to review the steps of the squaring of the blank, completion of the bottom closure, filling, and sealing of the top closure in the process of producing a completed package. This sequence of steps is shown in FIG. 21. In this FIG. 21, the container blank in various stages of erection will be referred to as 50a, 50b, etc. Briefly, container blanks are withdrawn from a magazine 90 by an appropriate loading mechanism 91 (FIG. 8) and the blanks are squared to a rectangular cross section 50a. The squared blanks are placed upon a rectangular mandrel 98 and, at substantially the same time, the bottom closure flaps are subjected to an initial creasing or preclosing operation to produce a blank 50b with partially folded bottom flaps. After receiving a squared container blank, the mandrel rotates to carry the container, with its bottom closure flaps projecting outwardly from the end of the mandrel 98, through a heating tunnel 134 where the polyethylene coating on the closure flap surfaces of the container 50c is raised to a temperature sufficiently high to cause it to melt. The heated bottom closure flaps are then folded together and the tuck-in flap inserted into position beneath the outer bottom flap by an appropriate tucking finger 162 as shown at 50d. Following the tucking operation, a sealing pressure is applied to the closed and heated bottom flaps by suitable pressure pads 209, 210 to cause the polyethylene on adjoining flaps to adhere together and seal any crevices formed between the flaps thereby to provide a liquidtight seal, as shown at 50e. The erected container 50f, having a closed bottom end 51, is placed into a basket 232 which is then immersed into a bath 234 of near-boiling water. The water bath sterilizes the containers which are then placed open end up on a conveyor 235 which carries them through a filling and sealing mechanism.

Prior to being filled, the top closure of the containers is folded to its closed position. This is accomplished by a mandrel 238 (FIGS. 13 and 14) which is inserted within the mouth of the container and by a pair of triangular fingers 239, 240 which engage the triangular infold panels 71, 78 of the top closure 52. Subsequent to this initial closing, the containers are subjected to a second preclosing operation by engagement therewith of a pair of steeple plates 243, 244 which serve to urge the closure flaps to their completely closed position.

Following the preclosing operation, the container 50g is filled with the desired product such as milk. The filled container is carried by the conveyor through a second heating tunnel 248 wherein the polyethylene coating on the inner surfaces of the upstanding top closure flaps is raised to a sufficiently high temperature to cause it to melt as shown at 50h. The heated closure flaps are then passed between a pair of converging rails 281, 282 which close the top flaps by bringing the upstanding rib panels together, as shown at 50i. The closed upstanding panels are engaged by the jaws 285, 286 of a pressure closing mechanism, and the polyethylene, being in a fused or relatively molten state acts as a pressure sensitive adhesive which effectively seals the top closure 52 of the container. The finished, filled container is shown at 50j and in FIG. 2.

In the event something occurs which necessitates stopping the machine, the heating tunnels 134, 248 automatically retract to an out of the way position over insulated reflector plates 142, 278, respectively. In this manner, while the tunnels remain hot, they do not heat the adjoining metal parts of the machine. Any suitable control may be provided for positioning the heating tunnels above their respective plates when the machine stops.

We claim as our invention:

1. In a machine for erecting, filling, closing and sealing containers having closure elements with thermoplastic material on the surfaces thereof, the combination comprising a conveyor adapted to move said containers in a given path, means adjacent the container path for exposing said container closure elements to heat to activate the thermoplastic material thereon, a pair of opposed closing rails situated along the container path, said rails being spaced from said heating means and converging in the direction of container movement for closing the same, and a pair of opposed cold metal sealing jaws connected to respective ones of said closing rails and adapted to maintain the latter at a temperature substantially less than the heated thermoplastic material so as to preclude adhesion between the latter and said rails.

2. In a machine for erecting, filling, closing and sealing containers having heat sealable gable top closure elements with thermoplastic material such as polyethylene on the surfaces thereof, the combination comprising a conveyor adapted to move said containers in a given path, means adjacent the container path for exposing said heat sealable top closure elements to heat to activate the thermoplastic material thereon, a pair of relatively cool opposed closing rails disposed in straddling relation along the container path, said rails being spaced from said heating means and fashioned to converge in the direction of container movement for closing said top closure elements, a pair of relatively cool pressure jaws disposed in straddling relation with the container path and situated adjacent the portion of greatest convergence of said closing rails, and means for cooling at least one of said pressure jaws.

3. In a machine for erecting, filling, closing and sealing containers having heat sealable gable top closure elements with thermoplastic material such as polyethylene on the surfaces thereof, the combination comprising a conveyor adapted to move said containers in a given path, means adjacent the container path for exposing said heat sealable top closure elements to heat to activate the thermoplastic material thereon, a pair of relatively cool opposed closing rails disposed in straddling relation along the container path, said rails being spaced from said heating means and fashioned to converge in the direction of container movement for closing said top closure elements, and a pair of opposed pressure jaws disposed in straddling relation with the container path and situated adjacent the portion of greatest convergence of said closing rails, one of said pressure jaws having a layer of coating material containing tetrafluorethylene thus precluding adhesion to the thermoplastic material on the closure elements.

4. In a machine for erecting, filling, closing and sealing containers having heat sealable gable top closure elements with thermoplastic material such as polyethylene on the surfaces thereof, the combination as set forth in claim 3 wherein both said pressure jaws have a layer of coating material containing tetrafluorethylene.

References Cited by the Examiner

UNITED STATES PATENTS

| | | | |
|---|---|---|---|
| 2,669,815 | 2/1954 | Zinn et al. | |
| 2,737,090 | 3/1956 | Nordquist | 93—44.1 X |
| 2,962,845 | 12/1960 | Lewis | 53—379 X |

FRANK E. BAILEY, *Primary Examiner.*

BERNARD STICKNEY, *Examiner.*